US009685729B2

(12) United States Patent
Nakayama

(10) Patent No.: US 9,685,729 B2
(45) Date of Patent: Jun. 20, 2017

(54) CONNECTOR DRIP-PROOF MEMBER AND CABLE STRUCTURE

(75) Inventor: Azuma Nakayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 383 days.

(21) Appl. No.: 13/824,460

(22) PCT Filed: Oct. 20, 2011

(86) PCT No.: PCT/JP2011/074155

§ 371 (c)(1),
(2), (4) Date: Mar. 18, 2013

(87) PCT Pub. No.: WO2012/056988

PCT Pub. Date: May 3, 2012

(65) Prior Publication Data

US 2013/0178087 A1 Jul. 11, 2013

(30) Foreign Application Priority Data

Oct. 26, 2010 (JP) ................................ 2010-239614

(51) Int. Cl.
*H02G 3/22* (2006.01)
*H01R 13/52* (2006.01)

(52) U.S. Cl.
CPC ......... *H01R 13/5221* (2013.01); *H01R 13/52* (2013.01)

(58) Field of Classification Search
CPC ...... H02G 15/013; H02G 15/04; H02G 3/083; H02G 3/22; H04B 3/06; H01B 17/00;
(Continued)

(56) References Cited

U.S. PATENT DOCUMENTS 4,194,750 A * 3/1980 Sovish ...................... F16L 5/02 174/77 R
4,719,315 A * 1/1988 Gregorac ................ H01R 9/05 174/73.1

(Continued)

FOREIGN PATENT DOCUMENTS

CN 1715472 1/2006
JP 61-185219 11/1986

(Continued)

OTHER PUBLICATIONS

Foreign Reference JP 10-224958.*

(Continued)

*Primary Examiner* — Pete Lee
(74) *Attorney, Agent, or Firm* — Wenderoth, Lind & Ponack, L.L.P.

(57) ABSTRACT

A connector drip-proof member includes a cylinder part configured to be attached to a cable whose end is connected to a connector so as to cover a part of the cable, and a barb portion linked to the cylinder part and configured to prevent droplets on the cable from reaching the connector. The barb portion includes an upper surface configured to face to a back end side of the cable, and an under surface configured to face to an end side of the cable. The cylinder part penetrates the barb portion from the upper surface to the under surface. The upper surface is concave. A connector drip-proof member and cable structure is provided which can be applied to a narrow space, reduce workload for attaching, and be manufactured at low costs.

10 Claims, 10 Drawing Sheets

(58) Field of Classification Search

CPC ...... H01B 17/26; H01B 17/30; H01B 17/583; H05K 2201/2036; H05K 3/301; H05K 3/303; H05K 7/14; H05K 7/142; B60R 16/0222; H01R 13/5221; H01R 13/52

USPC ....... 174/77 R, 152 G, 153 G, 138 G, 137 R, 174/650, 135

See application file for complete search history.

(56) References Cited

U.S. PATENT DOCUMENTS

| | | | | |
|---|---|---|---|---|
| 5,561,266 | A | 10/1996 | Okamoto et al. | |
| 5,739,475 | A * | 4/1998 | Fujisawa et al. | 174/153 G |
| 6,119,305 | A * | 9/2000 | Loveall et al. | 16/2.2 |
| 6,211,464 | B1 * | 4/2001 | Mochizuki | B60R 16/0222 16/2.1 |
| 6,815,615 | B1 * | 11/2004 | Haulotte et al. | 174/667 |
| 2002/0185297 | A1 * | 12/2002 | Otsuki | B60R 16/0222 174/650 |
| 2004/0140118 | A1 * | 7/2004 | Nishimoto | B60R 16/0222 174/650 |
| 2004/0206538 | A1 * | 10/2004 | Okuhara | B60R 16/0222 174/650 |
| 2006/0124339 | A1 * | 6/2006 | Goehlich | H02G 15/003 174/74 R |
| 2009/0014212 | A1 * | 1/2009 | Malak | 174/75 C |

FOREIGN PATENT DOCUMENTS

| | | | |
|---|---|---|---|
| JP | 63-10990 | | 1/1988 |
| JP | 6-44045 | | 6/1994 |
| JP | 10224958 | A * | 8/1998 |
| JP | 10-308585 | | 11/1998 |
| JP | 10308585 | A * | 11/1998 |
| JP | 11-69572 | | 3/1999 |
| JP | 2009-263992 | | 11/2009 |

OTHER PUBLICATIONS

JP 1169572 English Translation.*

JP 10-224958.*

JP 10-0308585 English Translation.*

JP11-69572 English Translation: published on Mar. 9, 1999.*

International Preliminary Report on Patentability and Written Opinion of the International Searching Authority issued May 14, 2013 in International (PCT) Application No. PCT/JP2011/074155.

International Search Report issued Dec. 27, 2011 in International (PCT) Application No. PCT/JP2011/074155.

Chinese Office Action dated May 27, 2015 issued in corresponding Chinese Patent Application No. 201180045515.8.

Decision to Grant a Patent issued Mar. 24, 2015 in corresponding Japanese patent application No. 2010-239614 (with English translation).

Chinese Office Action dated Feb. 3, 2016 issued in corresponding Chinese Application No. 201180045515.8.

Canadian Notice of Allowance dated Oct. 5, 2015 issued in corresponding Canadian Patent Application No. 2,812,990.

Notice of Allowance issued Aug. 8, 2016 in Chinese Patent Application No. 201180045515.8, with English translation.

Decision to Grant Patent issued Nov. 11, 2016 in European Patent Application No. 11836124.5.

* cited by examiner

CONNECTOR DRIP-PROOF MEMBER AND CABLE STRUCTURE

TECHNICAL FIELD

This present invention relates to a connector drip-proof member and a cable structure.

BACKGROUND ART

In order to electrically connect electric equipments, a cable structure is used. The cable structure contains a cable and a connector connected to an end of the cable. In the cable structure, there is a case where a water drop is generated on the cable by condensation. When the water drop runs down the cable to enter into the connector, electric connection may be disturbed. So, a water-proof means is provided in the cable structure.

As an example of the water-proof means, a drip loop can be listed. FIGS. 1A and 1B show examples of the cable structure in which the drip loop is provided, respectively. A cable structure 100 shown in FIG. 1A has a cable 101 and a connector 102 attached to one end of the cable 101. The cable 101 is bent at the vicinity of the connector 102, and a drip loop 103 is formed thereby. Similarly, the cable structure 100 shown in FIG. 1B has the cable 101 and the connector 102. The connector 102 is arranged to be downward. The cable 101 is bent at the vicinity of the connector to be convex upward, and the drip loop 103 is formed thereby. Since the drip loop 103 is formed, the water drop on the cable 101 is prevented from reaching the connector 102.

As another example of the water-proof means, potting can be listed. FIG. 2 is a schematic view showing the other example of the cable structure. In the cable structure shown in FIG. 2, a potting portion 104 is provided to cover a connection portion between the cable 101 and the connector 102. The potting portion 104 prevents liquid droplets on the cable 101 from entering into the connector 102.

Also, a different related technique is described in a patent literature 1 (Japanese Unexamined Utility Model (Registration) Application Publication No. H06-44045 U). The patent literature 1 discloses a water-proof code connector that is provided with: a connector body having a plurality of blade and an outer cap fitting with the connector body. This water-proof code connector has an insertion cylinder having an opening through which an electric wire code is inserted, in the outer shell cap. On the inner wall of the insertion cylinder, a plurality of water-proof valve are circumferentially arranged at many stages for protecting the water entering into the outer shell cap. One water-proof valve is arranged on the opening side via a winding groove placed on the inner wall of the insertion cylinder. Also, the plurality of water-proof valves are arranged on the inward side of the outer shell cap via the winding groove on the inner wall of the insertion cylinder.

CITATION LIST

[Patent literature 1] Japanese Unexamined Utility Model (Registration) Application Publication No. H06-44045 U

SUMMARY OF THE INVENTION

However, when the drip loop 103 is arranged as shown in FIGS. 1A and 1B, the cable 101 becomes longer than necessary. Moreover, depending on the location in which the cable structure is arranged, a space for the drip loop 103 may not be obtained.

Further, when the potting portion 104 is used as shown in FIG. 2, the potting portion should be cured after being applied. In order to form potting portion 104, much time is spent. Additionally, when detaching the connector 102 from the cable 101, the potting portion 102 should be removed and extra work is needed.

Also, according to the water-proof code connector disclosed in patent literature 1, the outer shell cap having water-proof valves, the winding groove or the like should be manufactured.

The outer shell having a complicated structure is needed, and that brings disadvantages in a cost of manufacturing connectors.

Accordingly, an object of the present invention is to provide a connector drip-proof member and cable structure, which can be applied to a narrow space, reduce workload for attaching, and be manufactured at low cost.

A connector drip-proof member according to the present invention includes a cylinder part configured to be attached to a cable whose end is connected to a connector so as to cover a part of the cable, and a barb portion linked to the cylinder part and configured to prevent droplets on the cable from reaching the connector. The barb portion includes an upper surface configured to face to a back end side of the cable, and an under surface configured to face to an end side of the cable. The cylinder part penetrates the barb portion from the upper surface to the under surface. The upper surface is concave.

According to the present invention, since the barb portion is provided, droplets are prevented from running down cable to reach the connector. Drip loops are not needed, and the connector drip-proof member can be attached to the cable even in a narrow space. Furthermore, since a potting material or the like is not needed, time is not spent in curing the potting material. Additionally, since a special structure is not necessary for the cable and the connector, waterproof processes can be conducted at low cost.

A cable structure according to the present invention includes above mentioned drip-proof member, a cable to which the connector drip-proof member is attached, and a connector connected to an end of the cable.

According to the present invention, a connector drip-proof member and cable structure is provided which can be applied to a narrow space, reduce workload for attaching, and be manufactured at low cost.

DESCRIPTION OF EMBODIMENTS

Embodiments of the present invention will be described below with reference to the drawings.

First Embodiment

Figure 1A:
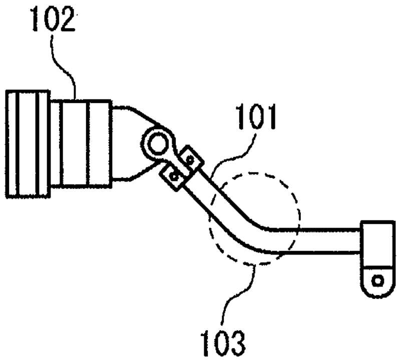
Fig. 1A PRIOR ART
FIG. 1A is a view showing one example of the cable structure in which the drip loop is provided.
Figure 1B:
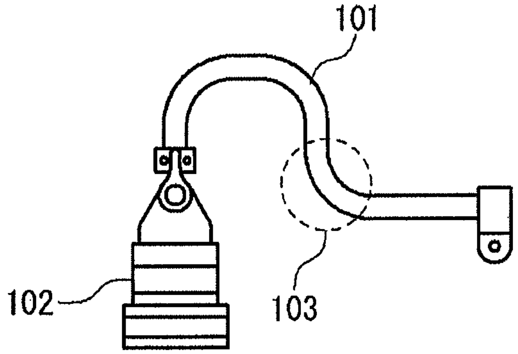
Fig. 1B PRIOR ART
FIG. 1B is a view showing a different example of the cable structure in which the drip loop is provided.
Figure 2:
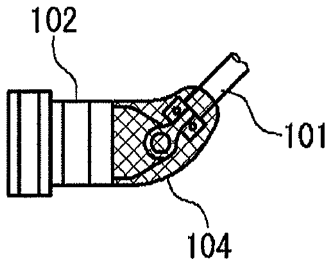
Fig. 2 PRIOR ART
FIG. 2 is a schematic view showing another example of the cable structure.
Figure 3:
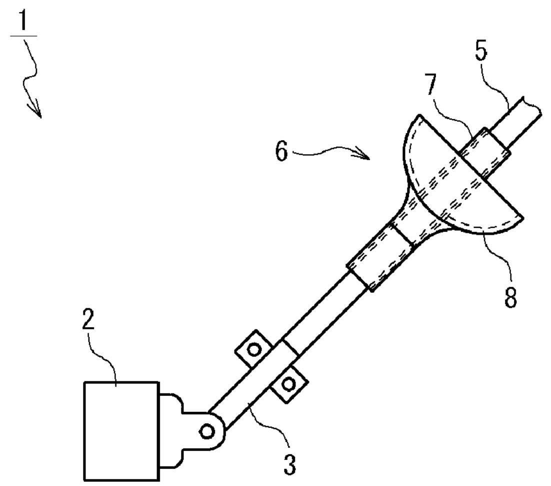
FIG. 3 is a schematic view showing a cable structure pertaining to a first embodiment.

FIG. 3 is a schematic view showing a cable structure 1 pertaining to the present embodiment. This cable structure 1 is assumed to be used to connect electronic equipments arranged in an airplane. There is a case that the attitude of the airplane changes during flight. For this reason, liquid droplets on a cable easily run down the cable. For this reason, a waterproof process against the liquid droplets running down the cable is requested. Also, a space in which the cable structure 1 can be arranged is limited. Thus, a waterproof process with small-footprint is required.

As shown in FIG. 3, the cable structure 1 pertaining to the present embodiment contains a cable 5, a connector 2, a back shell 3 and a connector drip-proof member 6. An edge of the cable 5 is inserted into the back shell 3. The back shell 3 is linked to the connector 2. The edge of the cable 5 is connected to the connector 2 via the back shell 3. As the cable 5, for example, an electric cable, an optical cable and the like are used.

The drip-proof member 6 is provided to prevent liquid droplets on the cable 5 from reaching the connector 2. The drip-proof member 6 is attached to the cable 5 at the vicinity of the back shell 3.

Figure 4:
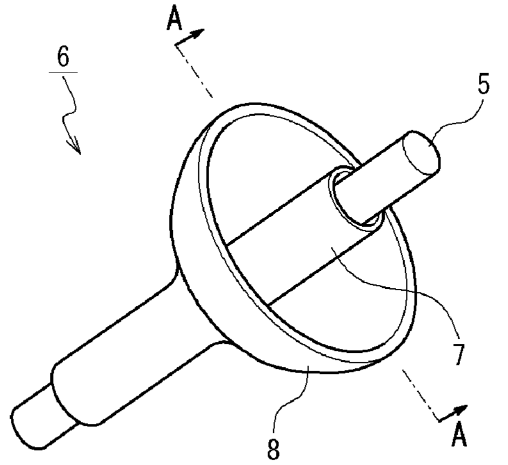
FIG. 4 is a perspective view showing a connector drip-proof member.
Figure 5:
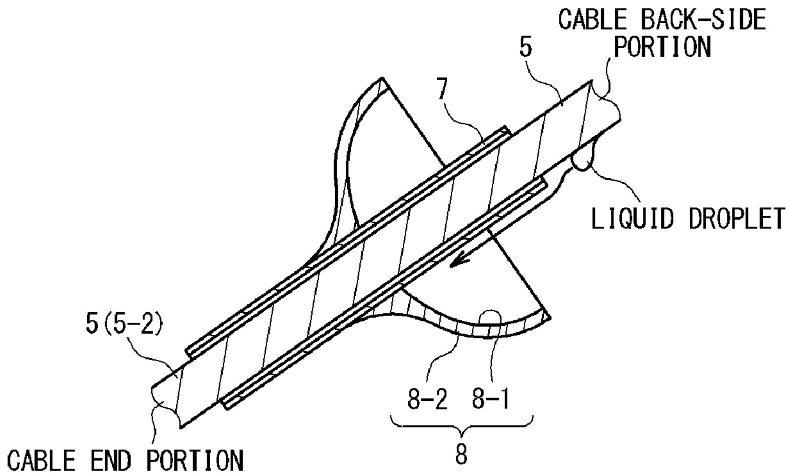
FIG. 5 is a sectional view showing the drip-proof member for the connector.

FIG. 4 is a perspective view showing the drip-proof member 6. Also, FIG. 5 is a sectional view showing the drip-proof member 6. As shown in FIGS. 4 and 5, the drip-proof member 6 has a cylinder part 7 and a barb portion 8.

The cylinder part 7 has a cylindrical shape. The cable 5 is inserted through the cylinder part 7. In other words, the cylinder part 7 is attached to the cable so that a part of the cable 5 is covered in the circumferential direction.

The barb portion 8 is provided for receiving the liquid droplets running down the cable 5. The barb portion 8 is ball-shaped and coupled to the cylinder part 7. In detail, the barb portion 8 has an upper surface 8-1 and an under surface 8-2, as shown in FIG. 5. The upper surface 8-1 is oriented to the back-side of the cable 5. The under surface 8-2 is oriented to the end portion of the cable. The upper surface 8-1 forms a concave surface. The cylinder part 7 penetrates through the barb portion 8, from the upper surface 8-1 to the under surface 8-2.

The material of the drip-proof member 6 is not limited. As the material of the drip-proof member 6, for example, plastic, rubber, shrinkage sleeve and the like can be used.

The above cable structure 1 can be obtained by a method described below. Before the cable 5 is connected to the back shell 3 and the connector 2, the cable 5 is inserted through the drip-proof member 6. Next, the back shell 3 and the connector 2 are attached to the end the cable 5. Consequently, the cable structure 1 is obtained.

According to the cable structure 1 pertaining to the present embodiment, the liquid droplets on the cable 5 are received by the barb portion 8. Thus, the liquid droplets are prevented from running down to enter into the connector 2.

Also, according to the present embodiment, the waterproof process can be conducted without installation of the drip loop and the like. The length of the cable 5 can be reduced, thereby enabling reduction in the weight of the cable structure 1. Moreover, since the cable 5 is not required to be bent, the cable structure 1 can be arranged even in a narrow space.

In addition, according to the present embodiment, the water-proof process can be conducted only by inserting the cable 5 through the drip-proof member 6. Potting agent and the like are not required, and the water-proof process can be conducted in a short time. Also, since the potting agent and the like are not used at a connection part between the connector 2 and the cable 5, a special work is not required for detaching the connector 2 from the cable 5.

Also, according to the present embodiment, a special configuration is not required in the connector 2 and the back shell 3. Accordingly, the manufacturing cost of the connector 2 and the back shell 3 can be suppressed.

In this embodiment, a case is explained in which the cable structure 1 is arranged inside the airplane. However, the cable structure 1 pertaining to the present embodiment is not limited to the one arranged inside the airplane, and can be applied to different fields. However, in the airplane, an installation space is limited. Also, in the airplane, many (for example, 1000 to 2000) cables are used, and reduction of weight is strongly required. Furthermore, in the airplane, the liquid droplets easily run down the cable 5 due to a change of attitude. From these viewpoints, the cable structure 1 pertaining to the present embodiment is preferably applied to airplanes.

Second Embodiment

Figure 6:
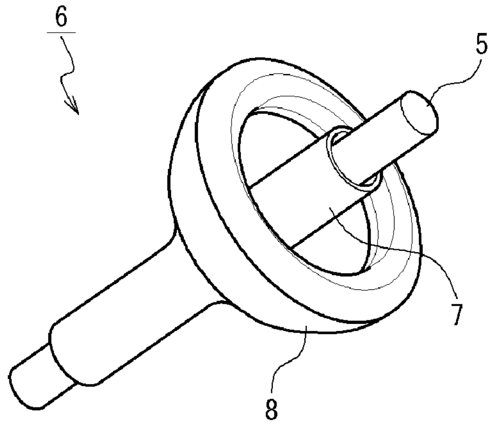
FIG. 6 is a perspective view showing a connector drip-proof member pertaining to a second embodiment.
Figure 7A:
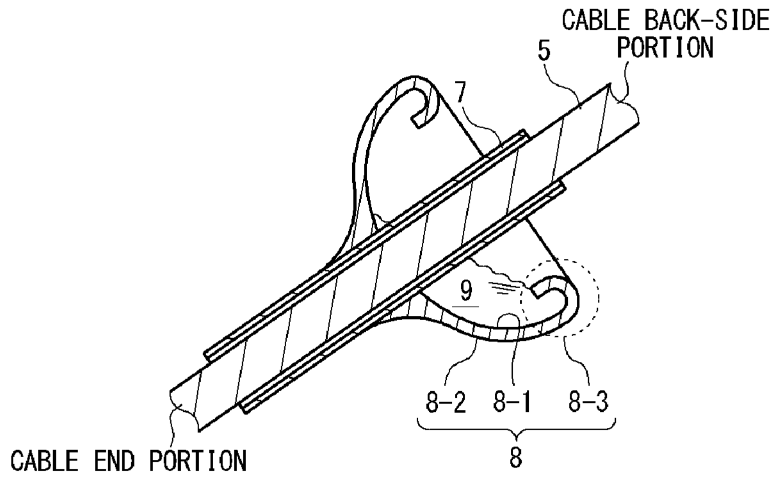
FIG. 7A is a sectional view showing the connector drip-proof member.

Next, the second embodiment will be described. FIG. 6 is a perspective view showing a drip-proof member 6 pertaining to the present embodiment, and FIG. 7A is its sectional view. In this embodiment, as compared with the first embodiment, the configuration of the barb portion 8 is revised. Since the other configurations can be similar to the first embodiment, detailed explanations will be omitted.

As shown in FIG. 7A, in this embodiment, a return portion 8-3 is added to the barb portion 8. The return portion 8-3 links to an outer edge of the upper surface 8-1 and extends to the cylinder part 5 side from the outer edge. Also, the return portion 8-3 is bent such that a tip portion is oriented to an end portion of the cable 5. That is, the return portion 8-3 has a hooked shape.

According to the present embodiment, as is the case in the first embodiment, the barb portion 8 receives the liquid droplets. Thus, the liquid droplets can be prevented from reaching the connector 2.

In addition, according to the present embodiment, since the return portion 8-3 is provided, liquid 9 (refer to FIG. 7A) received by the barb portion 8 can be prevented from spilling out. Thus, the liquid droplets are surely prevented from entering into the connector 2.

The return portion 8-3 is preferably provided over the entire circumference of the outer edge of the upper surface 8-1. If the return portion 8-3 is provided over the entire circumference, the liquid 9 can be further surely prevented from spilling out. However, the return portion 8-3 may be provided only on a part of the entire circumference of the outer edge.

Next, the variation example of the present embodiment will be described.

Figure 7B:
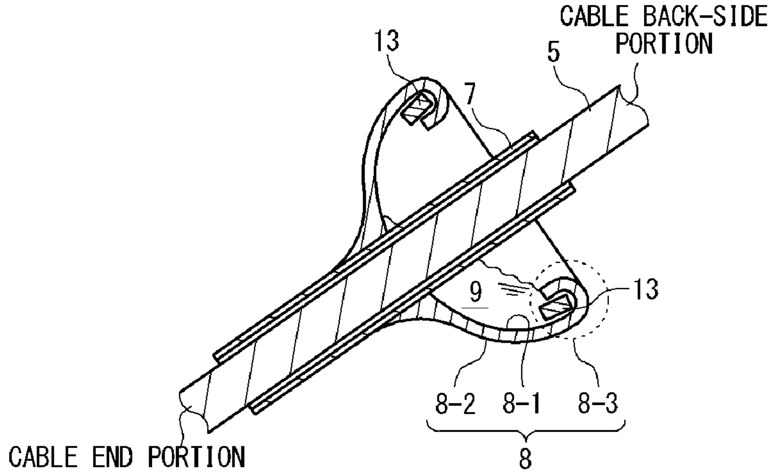
FIG. 7B a sectional view showing a connector drip-proof member pertaining to a variation example of the second embodiment.

FIG. 7B is a sectional view showing a drip-proof member 6 pertaining to this variation example. In this variation example, a water absorption member 13 is added. The water absorption member 13 is arranged in a concave portion formed by the return portion 8-3. Since the water absorption member 13 is arranged, on the outer edge (tip portion) of the upper surface 8-1, the liquid 9 is absorbed by the water absorption member 13. As a result, the liquid 9 can be further surely prevented from spilling out from the barb portion 8.

Figure 7C:
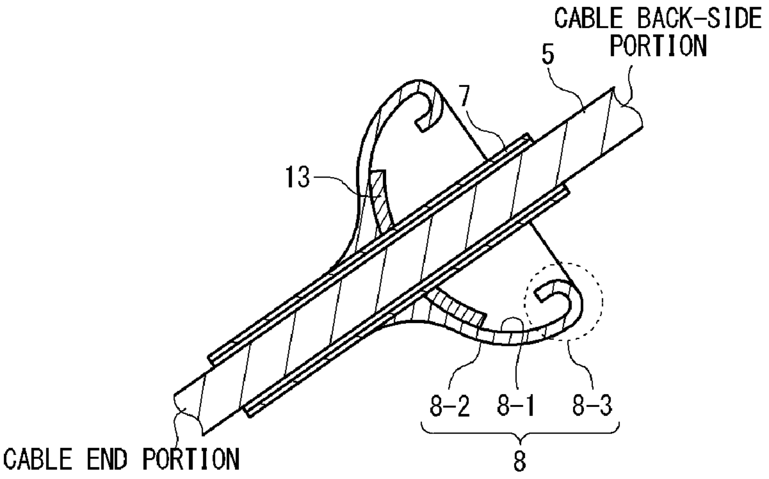
FIG. 7C is a sectional view showing a connector drip-proof member pertaining to a different variation example of the second embodiment.

The water absorption member 13 may be arranged on the upper surface 8-1, as shown in FIG. 7C. Even in the case where the water absorption member 13 is arranged at such a position, the liquid received in the barb portion 8 is absorbed, and the liquid can be prevented from spilling out from the barb portion 8.

Third Embodiment

Figure 8:
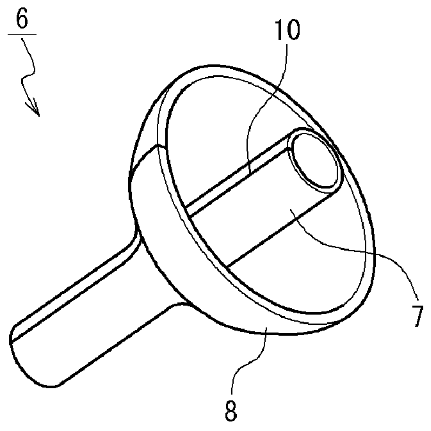
FIG. 8 is a perspective view showing a connector drip-proof member pertaining to a third embodiment.
Figure 9A:
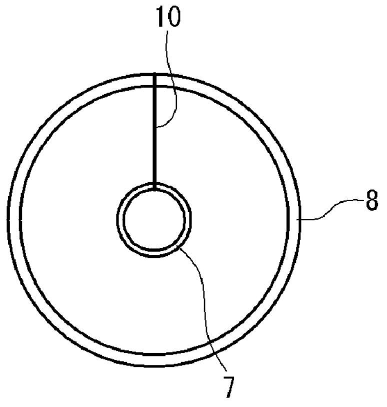
FIG. 9A is a view showing the connector drip-proof member when seen along an axial direction of a cylinder part.

Next, the third embodiment will be described. FIG. 8 is a perspective view showing a drip-proof member 6 pertaining to the present embodiment. Also, FIG. 9A is a view showing the drip-proof member 6 when seen along an axial direction of the cylinder part 7. In the present embodiment, as shown in FIGS. 8 and 9A, a slit portion 10 is provided in the cylinder part 7 and the barb portion 8. Also, the cylinder part 7 and the barb portion 8 are made of elastic materials. The other configurations can be similar to the already-described embodiments. Thus, detailed explanations will be omitted.

As shown in FIG. 8, the slit portion 10 extends from one end of the cylinder part 7 to the other end of the cylinder part 7. As shown in FIG. 9A, the slit portion 10 is arranged so that the cylinder part 7 and the barb portion 8 can be opened in the circumferential direction. That is, the drip-proof member 6 pertaining to the present embodiment can be opened in the circumferential direction at the slit portion 10.

Figure 9B:
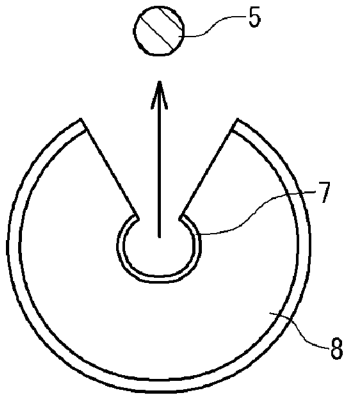
FIG. 9B is an explanation view for explaining a method of attaching the drip-proof member to the connector.

FIG. 9B is an explanation view for explaining a method of attaching the drip-proof member 6. As shown in FIG. 9B, after the drip-proof member 6 is opened in the circumferential direction, the drip-proof member 6 is attached to the cable 5 so that the cable 5 is covered by the cylinder part 7.

According to the present embodiment, since the slit portion 10 is provided, the drip-proof member 6 can be opened in the circumferential direction. For this reason, even after the cable 5 is connected to the connector 2 or the like, the drip-proof member 6 can be attached to the cable 5.

In this embodiment, the elastic material is used as the drip-proof member 6. As the elastic material, the plastic, the rubber, the shrinkage sleeve and the like can be used. Here, preferably, the material of the drip-proof member 6 has a property which enables the inner circumferential surface of the cylinder part 7 to be adhered to the cable 5 without any gap. From this viewpoint, a shrink sleeve is preferable, rubber is secondarily preferable, and plastic is thirdly preferable.

Fourth Embodiment

Figure 10:
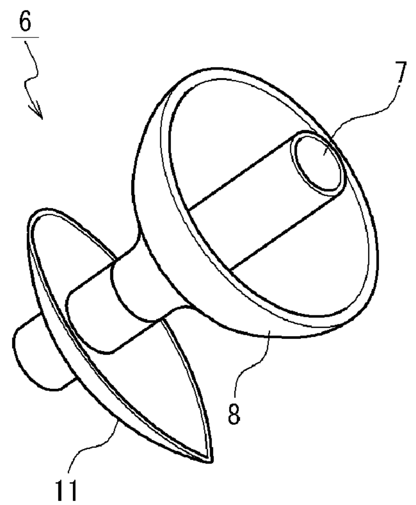
FIG. 10 is a perspective view showing a connector drip-proof member pertaining to a fourth embodiment.
Figure 11:
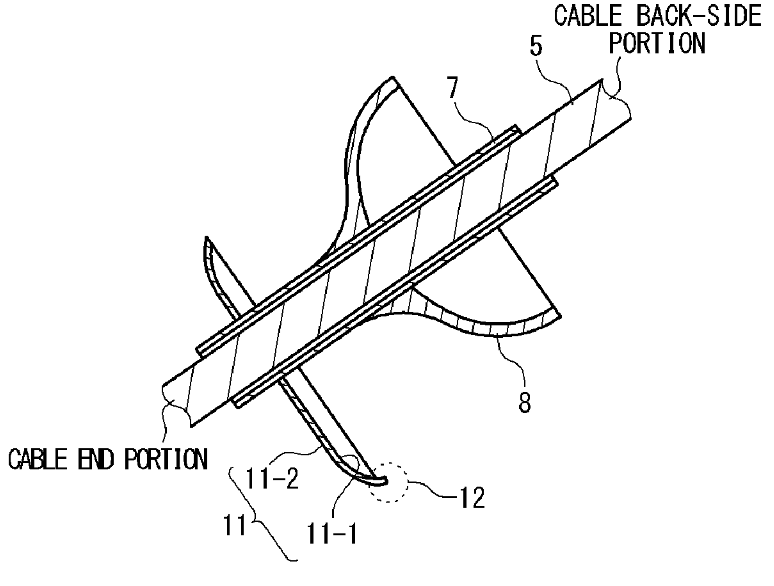
FIG. 11 is a sectional view showing a connector drip-proof member.

Next, the fourth embodiment will be described. FIG. 10 is a perspective view showing the drip-proof member 6 pertaining to the present embodiment. FIG. 11 is a sectional view showing the drip-proof member 6. As shown in FIGS. 10 and 11, in this embodiment, a drainer part 11 is added. Since the other configurations can be similar to the first embodiment, detailed explanations will be omitted.

The drainer part 11 is provided so that the liquid overflowed from the barb portion 8 is separated from the cable 5. As shown in FIGS. 10 and 11, the drainer part 11 is coupled to the cylinder part 7 at a position nearer to the end of the cable 5 than the barb portion 8. The drainer part 11 has a drainer upper surface 11-1 and a drainer under surface 11-2. The cylinder part 7 penetrates through the drainer part 11 from the drainer upper surface 11-1 to the drainer under surface 11-2. The drainer upper surface 11-1 is concave-shaped.

Figure 12:
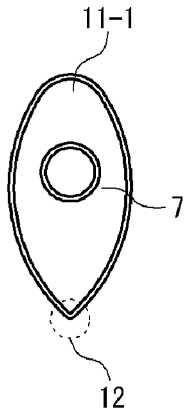
FIG. 12 is a view showing a drainer part when seen from a back-side of the cable.

FIG. 12 is a view showing the drainer part 11 when seen from the back-side of the cable 5. Illustration of the barb portion 8 is omitted. As shown in FIGS. 11 and 12, an edge of the drainer upper surface 11-1 has a corner 12 of a sharp angle. The drip-proof member 6 is attached to the cable 5 so that the corner 12 is downward side in vertical direction (refer to FIG. 11).

According to the present embodiment, even if the liquid overflows from the barb portion 8, the overflowed liquid is received by the drainer part 11. Here, since the corner 12 is provided to be oriented to the perpendicularly downward side, the received liquids drop from the corner 12 and do not run down the cable 5. Accordingly, the liquid droplets are further surely prevented from entering into the cable.

As mentioned above, the present invention has been described by the first to fourth embodiments. These embodiments and variation examples are not independent of each other. They can be used by combining in a range without any conflict.

This application claims a priority on convention based on Japanese Patent Application No. 2010-239614 filed on Oct. 26, 2010. The disclosure thereof is incorporated herein by reference.

The invention claimed is:

1. A connector drip-proof member, comprising: a cylinder part attached to a cable wherein an end of the cable is connected to a connector such that a part of the cable is covered by the cylindrical part; a barb portion connected to the cylinder part and configured to receive liquid droplets therein so as to prevent liquid droplets on the cable from reaching the connector; and a water absorption member configured to absorb liquid collected on a top surface of the barb portion, wherein the barb portion comprises: an upper surface configured to face a back-side of the cable; and an under surface configured to face an end side of the cable, wherein the cylinder part penetrates the barb portion from the upper surface to the under surface, wherein the upper surface is concave, wherein the barb portion further comprises an annular return portion connected to a radially outermost edge of the upper surface, the annular return portion extending toward the cylinder part from the radially outermost edge of the upper surface, and wherein the upper surface of the barb portion, an outer surface of the cylinder part and an inner surface of the annular return portion form an open space in which the liquid droplets are to be received, and wherein the water absorption member is arranged on the inner surface of the annular return portion.

2. The connector drip-proof member according to claim 1, wherein a slit portion is provided in the cylinder part and the barb portion so that the cylinder part and barb portion can be opened along a circumferential direction.

3. The connector drip-proof member according to claim 1, further comprising a drainer part connected to the cylinder part at a position nearer to the end of the cable than the barb portion.

4. The connector drip-proof member according to claim 1, wherein the cable is arranged inside an airplane.

5. A cable structure, comprising: a connector drip-proof member; a cable to which the connector drip-proof member is attached; and a connector connected to an end of the cable, wherein the connector drip-proof member comprises: a cylinder part attached to the cable wherein the end of the cable is connected to the connector such that a part of the cable is covered by the cylinder part; a barb portion connected to the cylinder part and configured to receive liquid droplets therein so as to prevent liquid droplets on the cable from reaching the connector, and a water absorption member configured to absorb liquid collected on a top surface of the barb portion, wherein the barb portion includes: an upper surface configured to face a back-side of the cable; and an under surface configured to face an end side of the cable, wherein the cylinder part penetrates the barb portion from the upper surface to the under surface, wherein the upper surface is concave, wherein the barb portion further comprises an annular return portion connected to a radially outermost edge of the upper surface, the annular return portion extending toward the cylinder part from the radially outermost edge of the upper surface, wherein the upper surface of the barb portion, an outer surface of the cylinder part and an inner surface of the annular return portion form an open space in which the liquid droplets are to be received, and wherein the water absorption member is arranged on the inner surface of the annular return portion.

6. The cable structure according to claim 5, wherein a slit portion is provided in the cylinder part and the barb portion so that the cylinder part and barb portion can be opened along a circumferential direction.

7. The cable structure according to claim 5, wherein the connector drip-proof member further comprising a drainer part connected to the cylinder part at a position nearer to the end of the cable than the barb portion, wherein the drainer part comprises: a drainer upper surface facing the back-side of cable; and a drainer under surface facing the end side of cable, wherein the cylinder part penetrates through the drainer part from the drainer upper surface to the drainer under surface, wherein the drainer upper surface has a concave shape, and wherein a shape of an outer edge of the drainer upper surface includes a corner when seen from the back-side of the cable.

8. A connector drip-proof member comprising: a cylinder part attached to a cable wherein an end of the cable is connected to a connector such that a part of the cable is covered by the cylindrical part; a barb portion connected to the cylinder part and configured to receive liquid droplets therein so as to prevent liquid droplets on the cable from reaching the connector; and a water absorption member configured to absorb liquid collected on a top surface of the barb portion, wherein the barb portion comprises: an upper surface configured to face a back-side of the cable; and an under surface configured to face an end side of the cable, wherein the cylinder part penetrates the barb portion from the upper surface to the under surface, wherein the upper surface is concave, wherein the barb portion further comprises an annular return portion connected to a radially outermost edge of the upper surface, the annular return portion extending toward the cylinder part from the radially outermost edge of the upper surface, wherein the annular return portion is curved such that a distal end of the annular return portion is oriented toward the end side of the cable, wherein the upper surface of the barb portion, an outer surface of the cylinder part and an inner surface of the annular return portion form an open space in which the liquid droplets are to be received, and wherein the water absorption member is arranged on the inner surface of the annular return portion.

9. The connector drip-proof member according to claim 8, wherein a slit portion is provided in the cylinder part and the barb portion so that the cylinder part and barb portion can be opened along a circumferential direction.

10. The connector drip-proof member according to claim 8, further comprising a drainer part connected to the cylinder part at a position nearer to the end of the cable than the barb portion, wherein the drainer part comprises: a drainer upper surface facing the back-side of cable; and a drainer under surface facing the end side of cable, wherein the cylinder part penetrates through the drainer part from the drainer upper surface to the drainer under surface, wherein the drainer upper surface has a concave shape, and wherein a shape of an outer edge of the drainer upper surface includes a corner when seen from the back-side of the cable.

* * * * *